United States Patent [19]

Ochiai

[11] Patent Number: 5,029,627
[45] Date of Patent: Jul. 9, 1991

[54] RADIAL PLY TIRE FOR HEAVY DUTY VEHICLES

[75] Inventor: Kiyoshi Ochiai, Kobe, Japan

[73] Assignee: Sumitomo Rubber Industries, Ltd., Hyogo, Japan

[21] Appl. No.: 350,161

[22] Filed: May 11, 1989

[30] Foreign Application Priority Data

May 18, 1988 [JP] Japan .................. 63-122650

[51] Int. Cl.⁵ .................. B60C 5/14; B60C 15/00
[52] U.S. Cl. .................. 152/510; 152/539; 152/543; 152/546; 152/DIG. 16
[58] Field of Search ........ 152/546, 510, 543, DIG. 16, 152/544, 539

[56] References Cited

U.S. PATENT DOCUMENTS

| | | | |
|---|---|---|---|
| 3,495,645 | 2/1970 | Gough | 152/539 |
| 4,508,153 | 4/1985 | Tanaka et al. | 152/546 X |
| 4,549,593 | 10/1985 | Yahagi et al. | 152/510 |
| 4,790,364 | 12/1988 | Lobb et al. | 152/546 X |

Primary Examiner—Michael W. Ball
Assistant Examiner—Mark A. Osele
Attorney, Agent, or Firm—Birch, Stewart, Kolasch & Birch

[57] ABSTRACT

A radial ply tire for heavy duty vehicles improved in bead durability, which has a bead reinforcing cord layer having an axially inner portion extending along the inside of the carcass main portion, and an inner liner disposed on the inside of the carcass main portion and the inside of the inner portion of the bead reinforcing layer, wherein the inner liner is provided with a middle portion of which thickness is gradually decreased radially outwardly, the heights of the lower end and upper end of the middle portion are respectively not smaller than 1.2 and 1.4 times the height of the upper edge of the axially inner portion of the reinforcing layer, the difference in thickness between the upper and lower ends of the middle portion is between 0.5 and 1.0 times the thickness at the upper end of the middle portion, and the thickness at 90% of the height of the upper edge of the axially inner portion of the reinforcing layer is between 0.9 and 1.2 times the thickness at the upper end of the middle portion.

3 Claims, 2 Drawing Sheets

RADIAL PLY TIRE FOR HEAVY DUTY VEHICLES

BACKGROUND OF THE INVENTION

The present invention relates to a radial ply tire for heavy duty vehicles having an improved bead durability.

Radial ply tires have been widely used for heavy duty vehicles such as trucks, buses and the like for increase in running speed due to the recent development and extension of highway networks and, in particular, for increase in tire load due to the recent large-sized vehicles such as construction vehicles.

In comparison with a bias ply tire, a radial ply tire has less rigidity at the sidewall portions due to its carcass ply construction, and accordingly such portions have more deformation. As a result, the bead portions are also repeatedly subjected to large deformation when running.

In the tires used with dump trucks under heavy loads and in the tires used with refrigerated trucks having a high gravitational center, strain in the bead portions becomes especially large, and a structural failure in the bead portion has sometimes been caused.

In the case where the carcass is composed of steel cords arranged radially of the tire and turned up at the edges thereof around bead cores from the inside to the outside thereof, structural failure is apt to be caused at the upper edge of the turned up portions of the carcass by the stress on the above-mentioned upper edges, which stress separates the cords from the surrounding rubber.

Such rubber separation at the upper edge of the carcass turned up portion has been known as a main cause for bead failure.

In order to prevent such separation failure, for example as shown in FIG. 3, a reinforcing layer C having an inner portion C1 and an outer portion C2 extending radially outwardly from the bead base region A along the axially inner main portion B1 and the axially outer tuned up portion B2 of the carcass B, respectively, has been often employed.

On the other hand, for prevention of the rubber separation at the upper edges of the carcass turned up portion, it is more effective to provide reinforcement on the axially inner side of the bead portion to increase the rigidity of the bead portion rather than to dispose a reinforcing layer axially outside the carcass turned up portion to directly cover the upper edge thereof.

Accordingly, the tire shown in FIG. 3 which is provided on the axially inner side of the bead portion with the above-mentioned axially inner portion C1 extending along the main portion B1 of the carcass B meets this requirement.

Such tire, however, sometimes has rubber separation at the upper edge of the axially inner portion C1 earlier than the above-mentioned rubber separation at the upper edge of the carcass turned up portion B2 in particular when the reinforcing layer is composed of only one ply.

Incidentally, if the axially inner portion is not formed on the reinforcing layer, the rubber separation at the upper edge of the carcass turned up portion becomes increased.

In order to prevent the rubber separation at the upper edge of the axially inner portion of the reinforcing layer, various studies were made, and it was found that, in conventional tires as shown in FIG. 4, the thickness of the rubber inner liner D becomes uneven and becomes very thin at the upper edge C1a of the axially inner portion C1, and this is a main cause for the separation thereat.

It is therefore, an object of the present invention to provide a radial ply tire for heavy duty vehicles, in which rubber separation at the upper edge of the axially inner portion of the bead reinforcing layer is prevented, and the durability of the bead portions is improved by maintaining the thickness of the inner liner at a constant thickness.

SUMMARY OF THE INVENTION

According to one aspect of the present invention, a radial tire for heavy duty vehicles comprises:

a pair of bead cores disposed one in each bead portion;

a radial carcass having radially arranged cords and turned up at the edge portions around the bead cores from the axially inside toward the axially outside thereof to form carcass turnup portions and a carcass main portion therebetween;

a bead reinforcing cord layer comprising an axially inner portion extending radially outwardly from the bead base region along the carcass main portion and an axially outer portion extending radially outwardly from the bead base region along the carcass turned up portion; and an inner liner disposed on the inside of the carcass and the inside of the bead reinforcing layer, the inner liner comprising an upper portion, a middle portion connected at the upper end thereof with the upper portion, and a lower portion connected with the lower end of the middle portion, the thickness of the middle portion gradually decreased towards radially outwardly of the tire, the height of the lower end of the middle portion of the inner liner from the bead base line being not smaller than 1.2 times the height of the upper edge of the axially inner portion of the reinforcing layer from the bead base line, the height of the upper end of the middle portion of the reinforcing layer from the bead base line being not smaller than 1.4 times the height of the upper edge of the axially inner portion of the reinforcing layer from the bead base line, the difference between the thickness from the inner face of the inner liner at the upper end of the middle portion to the carcass cords and the thickness from the inner face of the inner liner at the lower end of the middle portion to the carcass cords being between 0.5 and 1.0 times the above-mentioned thickness from the inner face of the inner liner at the upper end of the middle portion to the carcass cords, and the thickness from the inner face of the inner liner at a point in the lower part, whose height from the bead base line L is 0.9 times the height of the upper edge of the axially inner portion of the reinforcing layer from the bead base line, to the cords of the reinforcing layer being between 0.9 and 1.2 times the above-mentioned thickness from the inner face of the inner liner at the upper end of the middle portion to the carcass cords.

BRIEF DESCRIPTION OF THE DRAWINGS

An embodiment of the present invention will now be described, by way of example only, in conjunction with the following drawings in which.

DETAILED DESCRIPTION OF THE INVENTION

Figure 1:
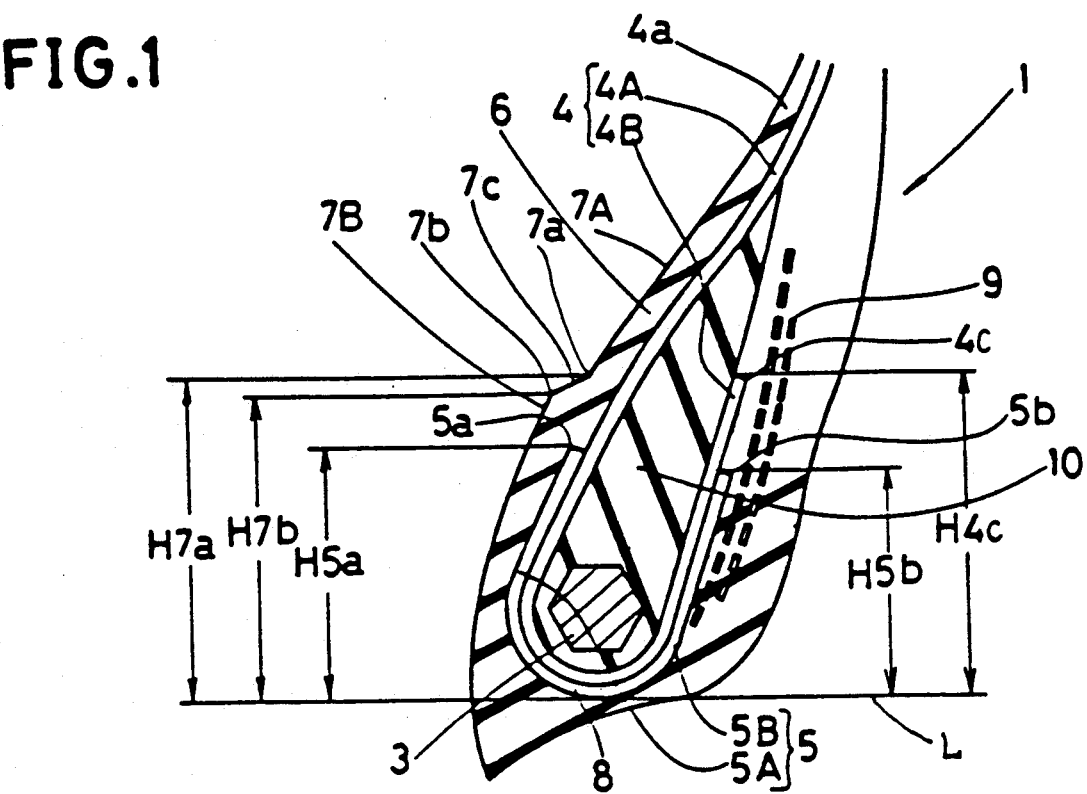
FIG. 1 is a sectional view showing the bead portion of an embodiment of the present invention.
Figure 2:
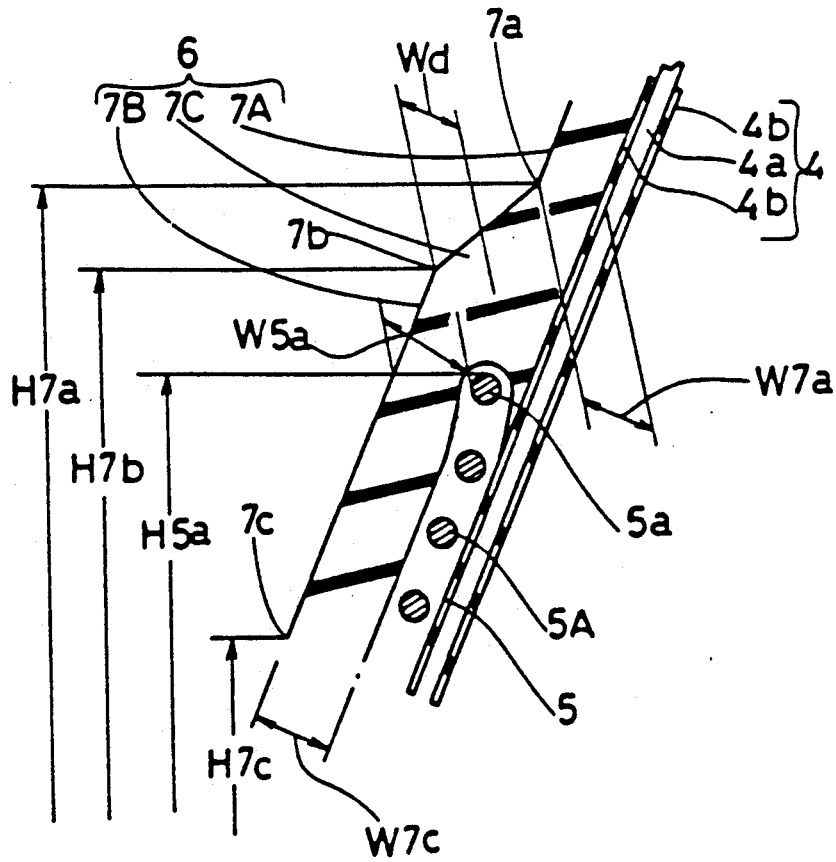
FIG. 2 is an enlarged sectional view showing the point thereof.

In FIGS. 1 and 2, a radial tire 1 for heavy duty vehicles has a radial carcass 4 extending between the bead portions of the tire.

The carcass has at least one ply, in this embodiment one ply, of cords 4a which are arranged radially of the tire and embedded in rubber 4b.

The carcass ply is turned up at the edges thereof around bead cores 3 from the axially inside to the outside thereof. For the carcass cord 4a, a high strength cord such as a steel cord and the like, is used.

The tire 1 is provided in each bead portion with a bead reinforcing layer 5. The bead reinforcing layer is disposed around the bead core 3, and extended radially outwardly from the bead base portion under the bead core to form an axially inner portion 5A and an axially outer portion 5B.

The height H5a of the upper edge 5a of the axially inner portion 5A from the bead base line L is larger than the height H5b of the upper edge of the axially outer portion 5B from the bead line L. Moreover, in this example, the height H4c of the upper edge 4c of the carcass turnup portion 4B from the bead base line L is larger than the above-mentioned height H5b.

For the cords of the bead reinforcing layer, high tensile cords such as steel cords, glass fiber cords, carbon fiber cords, aromatic polyamide fiber cords and so on can be used, but steel cords are preferably used. The cords are laid at 20 to 70 degrees to the carcass cords.

Furthermore, in each bead portion, an organic cord layer 9 composed of plural plies of organic fiber cords is disposed axially outward of the above-mentioned outer portion 5B of the bead reinforcing layer 5 and the carcass turnup portion 4B, Still furthermore, a bead apex 10 is disposed radially outward of the bead core 3.

The tire 1 is provided with an inner liner 6 extending from one bead portion to the other bead portion along the inner face of the inner portion 5A of the bead reinforcing layer 5 and the inner face of the carcass main portion 4A through the tire sidewall portions and tread portion in order to prevent air leakage and penetration of moisture into the carcass to increase the durability of the carcass and the bead.

The inner liner is made of a rubber compound having a high airtightness and the compound has a JIS A hardness between 45 and 60 more preferably 50 and 55, and a modulus of elasticity at 200% elongation between 20 and 30 kgf/sq.cm.

In each bead portion, the inner liner is provided between its upper portion 7A and lower portion 7B with a portion 7C of which thickness gradually decreases towards radially outwardly of the tire.

The upper portion 7A and the lower portion 7B are smoothly connected to the upper end 7a and the lower end 7b of the above-mentioned middle thickness varying portion 7C, respectively, without any step or difference in thickness to avoid stress concentration.

The lower portion 7B extends radially outwardly from the bead base region beyond the upper edge 5a of the axially inner portion 5A of the bead reinforcing layer 5 to form a thick portion around the upper edge 5a, which thick portion can prevent the upper edge 5a from the rubber separation.

The height H7b of the lower end 7b of the middle portion 7C from the bead base line L is set to be more than 1.2 times the height H5a of the upper edge 5a of the axially inner portion 5A of the bead reinforcing layer 5 from the bead base line L.

Furthermore, the height H7a of the upper end 7a of the middle portion 7C from the bead base line L is set to be more than 1.4 times the above-mentioned height H5a.

The thickness of the inner liner 6 is arranged so that the thickness from the inner face of the inner liner 6 to the adjacent reinforcement cords including the carcass cords and the bead reinforcing layer cords satisfys the following conditions:

The difference Wd between the thickness W7a from the inner face at the upper end 7a to the carcass cords 4a and the thickness from the inner face at the lower end 7b to the carcass cords 4a is set to be more than 0.5 times and less than 1.0 times the above-mentioned thickness W7a at the upper end 7a so as to make the difference a proper small thickness in order to prevent stress concentration;

The thickness W7c from the inner face of the inner liner 6 at a point 7c to the cords of the reinforcing layer 5 is more than 0.9 times and less than 1.2 times the above-mentioned thickness W7a at the upper end 7a, wherein the point 7c is such a point of which height H7c is 0.9 times the height H5a of the upper edge 5a of the inner portion 5A; and The thickness of the portion inward of the inner portion 5A is nearly the same as the thickness of the portion inward of the carcass main portion 4A.

If the difference Wd is less than 0.5 times the thickness W7a, such difference is too small, and it becomes impossible to keep a proper thickness for the upper portion 7A when the thickness of the lower portion 7B is set in a proper range. That is, the thickness of the upper portion 7A becomes too thick, thereby the tire weight and cost are undesirably increased. On the other hand, if the difference Wd is more than 1.0 times, such difference is so large that generation of stress can not be prevented, and further the upper part 7A becomes too thin when the lower part 7B is set at a proper thickness.

Furthermore, in this embodiment, the thickness W5a from the inner face of the inner liner 6 at the upper edge 5a of the inner portion 5A to the cords of the reinforcing layer 5 is set to be more than 2.0 mm and less than 4.5 mm.

By setting the thickness W5a in such range, the rubber separation at the upper edge 5a is effectively prevented, and at the same time, the airtightness is further improved. If it is less than 2.0 mm, the airtightness and reinforcement become poor, and if it is more than 4.5 mm, the rubber thickness becomes so large that the tire has a less flexibility and tire cost and weight become increased.

Incidentally, an easy method to make the tires according to the present invention is to change the shape of the bladder which is used in a tire vulcanizing process.

The bead durability of test tires was evaluated through a running test using a drum tester under the following test conditions:
Tire size: 12R22.5
Rim size: 8.25×22.5
Inner pressure: 8 kgf/sq.cm
Load: 9,000 kg
Speed: 25 km/h The test results are indicated in Table 1 by using an index based on the assumption that the measured value for the Embodiment tire 1 is 100, wherein the higher index means better durability. It is apparent from the test results that the Embodiment tires were improved in bead durability.

TABLE 1

(Tire size: 12R22.5)

(a)

|  | Ex. 1 | Ex. 2 | Ex. 3 | Ex. 4 | Ex. 5 |
| --- | --- | --- | --- | --- | --- |
| Bead construction | FIGS. 1 & 2 | FIGS. 1 & 2 | FIGS. 1 & 2 | FIGS. 1 & 2 | FIGS. 1 & 2 |
| Carcass | 1 ply | 1 ply | 1 ply | 1 ply | 1 ply |
| Cord | 7 × 4/0.175 | 7 × 4/0.175 | 7 × 4/0.175 | 7 × 4/0.175 | 7 × 4/0.175 |
| Height $H_{4c}$ | 40 mm | 40 mm | 40 mm | 40 mm | 40 mm |
| Reinforcing layer | 1 ply | 1 ply | 1 ply | 1 ply | 1 ply |
| Cord | 9 × 4/0.175 | 9 × 4/0.175 | 9 × 4/0.175 | 9 × 4/0.175 | 9 × 4/0.175 |
| Cord angle | 25 deg | 25 deg | 25 deg | 25 deg | 25 deg |
| Height $H_{5a}$ | 25 mm | 25 mm | 25 mm | 25 mm | 25 mm |
| Height $H_{5b}$ | 30 mm | 30 mm | 30 mm | 30 mm | 30 mm |
| Inner liner |  |  |  |  |  |
| Height $H_{7a}$ | 42 mm | 42 mm | 42 mm | 42 mm | 42 mm |
| Height $H_{7b}$ | 36 mm | 36 mm | 36 mm | 36 mm | 36 mm |
| Difference $W_d$ | 1.2 mm | 1.8 mm | 0.9 mm | 1.2 mm | 1.2 mm |
| Thickness $W_{7a}$ | 1.8 mm | 1.8 mm | 1.8 mm | 1.8 mm | 1.8 mm |
| Thickness $W_{7c}$ | 2.0 mm | 2.0 mm | 2.0 mm | 1.7 mm | 2.0 mm |
| Thickness $W_{5a}$ | 2.5 mm | 2.5 mm | 2.5 mm | 2.5 mm | 2.5 mm |
| Test result (index)* | 100 | 98 | 93 | 85 | 88 |

(b)

Figure 3:
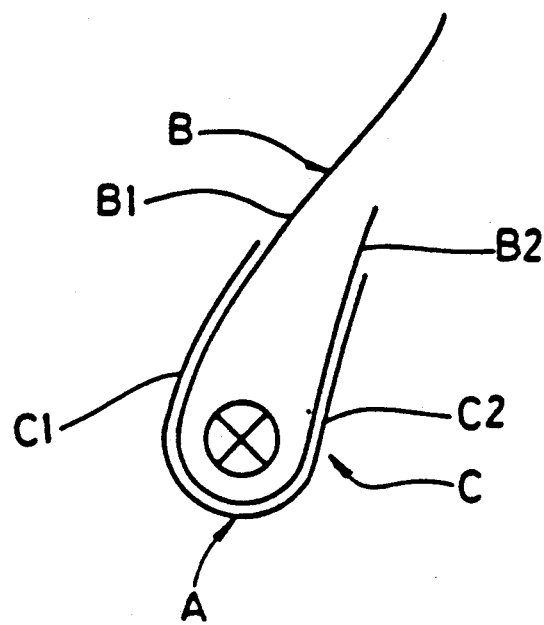
FIG. 3 is a diagrammatical view showing the conventional tire.
Figure 4:
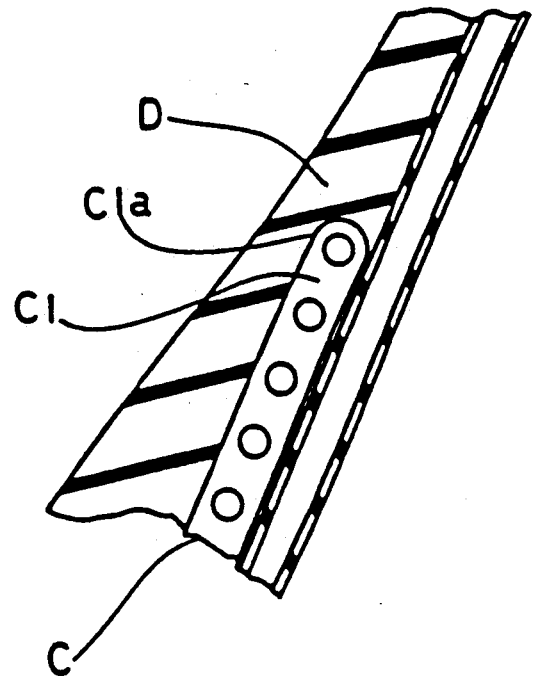
FIG. 4 is a sectional view showing the upper region of the reinforcing layer thereof.

|  | Ref. 1 | Ref. 2 | Ref. 3 | Ref. 4 | Ref. 5 |
| --- | --- | --- | --- | --- | --- |
| Bead construction | FIG. 3 | FIG. 3 | FIGS. 1 & 2 | FIGS. 1 & 2 | FIGS. 1 & 2 |
| Carcass | 1 ply | 1 ply | 1 ply | 1 ply | 1 ply |
| Cord | 7 × 4/0.175 | 7 × 4/0.175 | 7 × 4/0.175 | 7 × 4/0.175 | 7 × 4/0.175 |
| Height $H_{4c}$ | 30 mm | 40 mm | 40 mm | 40 mm | 40 mm |
| Reinforcing layer | 1 ply | 1 ply | 1 ply | 1 ply | 1 ply |
| Cord | 9 × 4/0.175 | 9 × 4/0.175 | 9 × 4/0.175 | 9 × 4/0.175 | 9 × 4/0.175 |
| Cord angle | 25 deg | 25 deg | 25 deg | 25 deg | 25 deg |
| Height $H_{5a}$ | 25 mm | 25 mm | 25 mm | 25 mm | 25 mm |
| Height $H_{5b}$ | 40 mm | 30 mm | 30 mm | 30 mm | 30 mm |
| Inner liner |  |  |  |  |  |
| Height $H_{7a}$ | 42 mm | 32 mm | 42 mm | 42 mm | 42 mm |
| Height $H_{7b}$ | 36 mm | 27 mm | 36 mm | 36 mm | 36 mm |
| Difference $W_d$ | 1.2 mm | 1.2 mm | 1.2 mm | 0.7 mm | 2.0 mm |
| Thickness $W_{7a}$ | 1.8 mm | 1.8 mm | 1.8 mm | 1.8 mm | 1.8 mm |
| Thickness $W_{7c}$ | 2.0 mm | 2.0 mm | 2.0 mm | 2.0 mm | 2.0 mm |
| Thickness $W_{5a}$ | 2.5 mm | 2.5 mm | 1.5 mm | 2.5 mm | 2.5 mm |
| Test result (index)* | 75 | 65 | 62 | 68 | 70 |

*80 is the standard

As described above, in the tire according to the present invention, the rubber separation at the upper edge of the carcass turned up portion is prevented by forming the axially inner portion on the reinforcing layer, and the rubber separation at the upper edge of this axially inner portion of the bead reinforcing layer is effectively prevented by forming the thickness varying portion on the inner liner at the position radially outward of the upper edge of the axially inner portion of the reinforcing layer.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A radial tire comprising:

a pair of bead cores disposed one in each bead portion of the tire;

a carcass having radially arranged cords and turned up at the edge portions around the bead cores from the axially inside to the axially outside thereof to form axially outward turnup portions and an axially inward main portion;

a bead reinforcing cord layer comprising
   an axially outer portion extending radially outwardly, and located axially outwardly of the carcass turned up portion and
   an axially inner portion extending radially outwardly, and located axially inwardly of the carcass main portion; and
   an inner liner disposed on the inside of the carcass main portion and axially inwardly of said axially inner portion of the bead reinforcing layer, said inner liner comprising a lower portion, a middle portion, and an upper portion;

said lower portion being substantially constant in thickness and extending radially inwardly from the radially outer edge (5a) of the axially inner portion of the bead reinforcing layer, said middle portion extending between the upper portion and the lower portion, and said upper portion being substantially constant in thickness and extending radially outwardly from a first point (7a) which defines the upper end of the middle thickness varying portion of the inner liner, wherein a first height measured from the bead base line to said first point is not smaller than 1.4 times a second height measured from the bead base line to the radially outer edge (5a) of the axially inner portion of the bead reinforcing layer;

the quotient of a thickness measured from the inner liner surface, at a second point (7c) whose height from the bead base line is 0.9 times said second height, to the cords of the bead reinforcing layer, to a thickness measured from the inner liner surface at said first point (7a) to the carcass cords, being in the range of from 0.9 to 1.2, said middle portion being provided with a thickness-varying part extending radially inwardly from said first point (7a) to a third point (7b) whose height from the bead base line is not smaller than 1.2 times said second height, in which part the inner liner is increased in thickness radially inwardly and gradually so that the surface thereof slopes inwardly of the tire from the first point (7a) to the third point (7b), and the difference between the thickness at the first point (7a) and the thickness at the third point (7b) is in the range of from 0.5 to 1.0 times the thickness at the first point (7a).

2. The radial tire according to claim 1, wherein the radially outer edge of said axially outer portion of the bead reinforcing layer is located radially inside the radially outer edge of the carcass turnup portion.

3. The radial tire according to claims 1 or 2, wherein the thickness of the inner liner measured from the surface to the cords of the reinforcing layer at said radially outer edge of the axially inner portion of the bead reinforcing layer is in the range of 2.0 to 4.5 mm.

* * * * *